United States Patent [19]

Kim et al.

[11] Patent Number: 4,978,601

[45] Date of Patent: Dec. 18, 1990

[54] LEAD ALLOY BATTERY GRIDS BY LASER TREATMENT

[75] Inventors: Michael M. Kim, Raleigh; Dodd S. Carr, Durham, both of N.C.

[73] Assignee: International Lead Zinc Research Organization, Inc., Research Triangle Park, N.C.

[21] Appl. No.: 428,617

[22] Filed: Oct. 30, 1989

[51] Int. Cl.$^5$ .............................................. H01M 4/73
[52] U.S. Cl. ........................................... 429/245; 29/2
[58] Field of Search ...................... 429/233, 245; 29/2; 219/121.6, 121.65

[56] References Cited

U.S. PATENT DOCUMENTS

| | | | |
|---|---|---|---|
| 4,689,874 | 9/1987 | Nishiura | 437/181 x |
| 4,734,379 | 3/1988 | Kamiyama | 437/51 X |
| 4,859,496 | 8/1989 | Toyonaga et al. | 427/53.1 |

OTHER PUBLICATIONS

Vesely, Jr., E. J. and Verma, S. K., "The Use of High Power Lasers in Surface Modifications" in Surface Modification Technologies II (Sudarshan, T. S. and Bhat, D. G. eds.), Proceedings of the Second International Conference on Surface Modification Technologies, Sep. 26-28, 1988, pp. 117-23.

Molian, P. A. and Hsu, M. J., "Machinability of Laser Coated High Speed Steels" in Surface Modification Technologies II (Sudarshan, T. S. and Bhat, D. G. eds.), Proceedings of the Second International Conference on Surface Modification Technologies, Sep. 26-28, 1988, pp. 155-73.

*Primary Examiner*—Anthony Skapars
*Attorney, Agent, or Firm*—Brumbaugh, Graves, Donohue & Raymond

[57] ABSTRACT

There is disclosed a method of laser treating lead-containing battery grids such that virtually instantaneous melting and solidfication occurs, thereby yielding an improved fine-grained microstructure even with such normally immiscible (in lead) metals as aluminum. The invention also permits a high aluminum content without the metal vaporization and oxidation, or the coarse grain structure, normally encountered. The fine grain structure of the treated product provides a battery grid having improved weight, electrical, mechanical and corrosion-resistant properties.

33 Claims, 4 Drawing Sheets

Figure 1 - Density vs. Volume % Aluminum in Lead

Figure 2 - Resistivity vs. Volume % Aluminum in Lead

LEAD ALLOY BATTERY GRIDS BY LASER TREATMENT

BACKGROUND OF THE INVENTION

The present invention relates to a novel method of heat treating lead compositions as well as novel and improved materials produced by such treatment. The present invention finds particular application in the field of lead-containing battery grids, and provides solutions to a number of disparate problems heretofore encountered in this field.

A first problem involves the manufacture of lead battery grids which contain one or more additional elements in order to reduce weight, increase conductivity and/or increase strength. For example, various compositions of lead and aluminum have been tried since aluminum is both lighter and more conductive than lead. In this regard, a major goal of lead-acid battery manufacturers is to improve the efficiency of their products. One way of accomplishing this is to reduce the weight of their products and to lower the internal resistance of their batteries. In the case of electric vehicles (for example, golf carts), lighter batteries would extend the driving range and more conductive battery grids would improve the rate of recharging (especially in the case of tall batteries).

Figure 1:
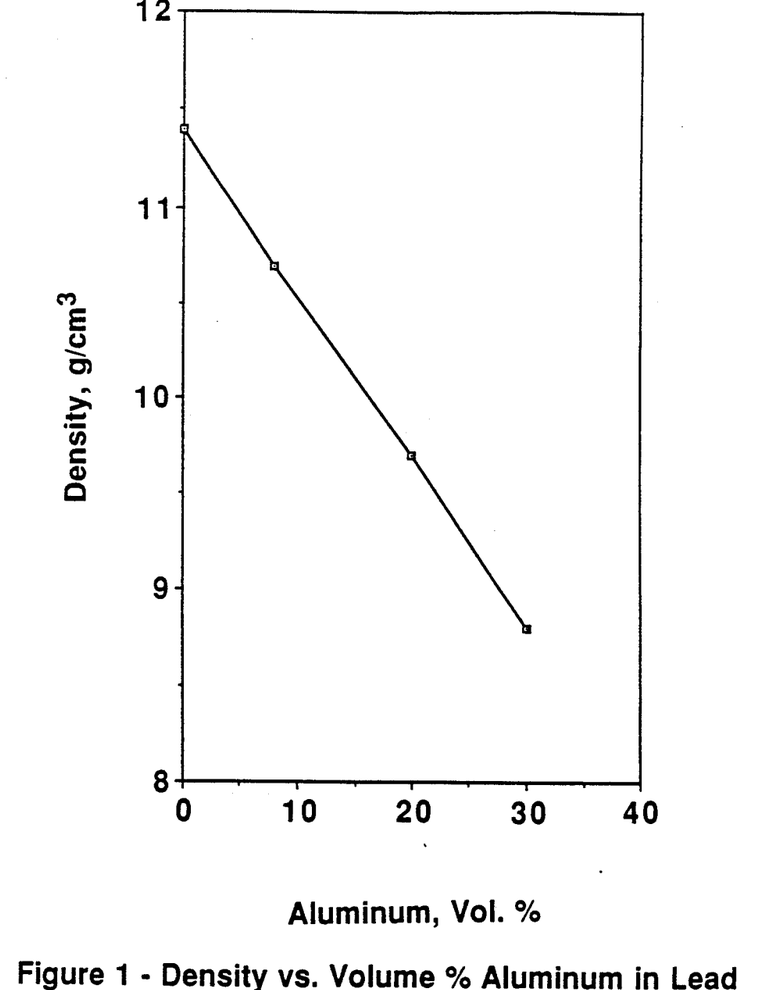
FIG. 1 is a graphic representation of the reduction in density of a lead-aluminum mixture with increase in aluminum concentration.
Figure 2:
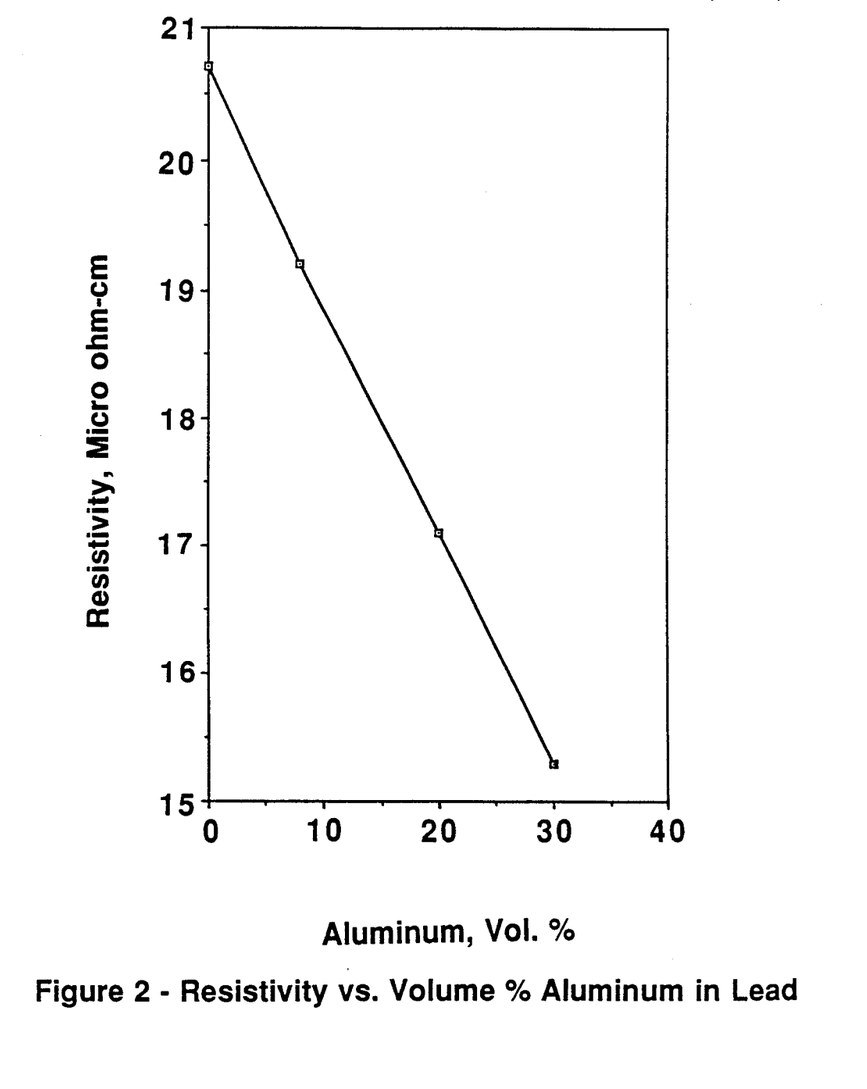
FIG. 2 is a graphic representation of the reduction in resistivity of a lead-aluminum mixture with increase in aluminum concentration.

The following table, containing data represented in FIGS. 1 and 2, illustrates the reduction of density and resistivity in lead grids by the substitution of aluminum.

| Lead wt. % | Aluminum wt. % | Aluminum Vol. % | Density g/cm$^3$ | Density % Reduction | Resistivity $\mu$ohm-cm | Resistivity % Reduction |
|---|---|---|---|---|---|---|
| 100 | 0 | 0 | 11.4 | 0.0 | 20.7 | 0.0 |
| 95.4 | 4.6 | 8 | 10.7 | 6.1 | 19.2 | 7.0 |
| 88 | 12 | 20 | 9.7 | 15.3 | 17.1 | 17.4 |
| 81 | 19 | 30 | 8.8 | 22.9 | 15.3 | 26.1 |

Both density and resistivity follow the law of mixtures, that is, they are proportional to the volume percentage substitution of aluminum in the lead grid. Thus, for example, a 30% by volume substitution of aluminum (19% by weight) in a lead battery grid will result in a 22.9% weight reduction and a resistivity reduction of 26.1%.

On the other hand, lead and aluminum are substantially immiscible and they have widely varying melting points (lead=327.5° C.; aluminum=660.37° C.) and boiling points (lead=1740° C.; aluminum=2467° C.). It is well known that when metals and alloys are heated and cooled slowly they tend to recrystallize and develop larger-grain structures. This generally lowers the hardness, tensile strength, and corrosion resistance of such metals and alloys. During the recrystallization process, foreign elements in the lead tend to segregate at the grain boundaries and promote intergranular corrosion in battery acid electrolytes.

Therefore, considerable difficulty has been had in obtaining a composition with substantial amounts of aluminum, particularly where the aluminum is to be finely dispersed throughout the lead.

As disclosed in commonly owned pending U.S. Pat. application Ser. No. 249,708, filed Sept. 27, 1988, rapid solidification techniques permit the creation of leadaluminum compositions wherein the aluminum is present in uniformly dispersed regions less than 30 microns in size. However, even when employing this improved method, the melting point of the lead-aluminum mixture (keeping in mind that rapid solidification techniques involve melting the mixture, and then instantly solidifying it before large regions of a given element or compound have a chance to form) rises as the aluminum content increases At high aluminum concentrations, i.e., exceeding about 4%, the high melting point of the mixture caused the lead and aluminum to vaporize and oxidize. Metal vapors, e.g. lead vapor, are environmentally hazardous and must be either eliminated or contained with expensive equipment.

The present invention permits high aluminum content in a lead-aluminum composition without substantial vaporization or oxidation of the lead and aluminum mixture while permitting small uniformly dispersed aluminum regions in the resulting product.

Also, considerable effort has been expended toward the development of lead-antimony battery grids. Lead alloys, typically containing up to 8% or as high as 12% antimony, have been widely used in the construction of automotive batteries for starting-lighting-ignition (SLI) applications. Moreover, grids of such alloys are used where deepdischarge/charge cycles are encountered (for example, in golf carts and fork lift trucks in warehouses). Such alloys are stronger than pure lead and they provide better bonding and electrical contact with the "active material" on the grid. The "active material" is essentially lead sulfate that is electrochemically converted to lead dioxide when the battery is charged. On discharge, the dense lead dioxide reverts to relatively bulky lead sulfate. This "shape change" promotes "paste shedding" from the positive plate. Antimonial lead grids develop an intercrystalline bond with the active material, thereby reducing paste shedding.

However, some antimony from the positive grid migrates through the electrolyte to the negative electrode. This causes a lowering of the hydrogen overvoltage on the surface of the negative electrode in the battery with resulting gassing (hydrogen bubbles form and escape - through decomposition of water in the water/sulfuric acid electrolyte in the battery). As a result, it is necessary to add "makeup water" to replenish that lost through gassing. Otherwise, the battery would fail by drying out.

At least two methods of producing lead-antimony alloy grids for batteries have been employed, namely, casting and rolling. Cast grids are made by pouring molten lead alloy into a mold and then separating the chilled metal from the mold. For example, a "book-mold" may be used to cast battery grids, so that the grid can be removed when the mold is opened. In recent years, equipment has been developed for continuous casting of grids which are subsequently cut apart into individual grids.

To assist in the automation of battery manufacturing, lead-antimony alloy strip can be rolled to the desired grid thickness, slit intermittently in the longitudinal direction, and then expanded sideways to form diamond-shaped openings to accept the active material paste.

In the case of both cast and rolled lead-antimony grids, conventional heat treatment in an oven cannot provide the rapid cooling rates necessary to obtain the desired properties. The resulting relatively coarse grain structure leads to corrosion problems, and, particularly in the case of rolled grids, the lack of mechanical strength is a problem.

In order to overcome the inconvenience, cost, and hazards of adding water to lead-acid batteries, so-called "maintenance-free" batteries were developed some twenty years ago. Such batteries are "sealed" to prevent loss of water (but they do have a safety valve in case the internal pressure should become hazardous). They also contain a "recombination catalyst" which allows the oxygen that was evolved from the positive electrode (during the charging step) to react with the hydrogen gas from the negative electrode to form water, which drips back into the electrolyte. Antimony-free grids are required for the successful operation of maintenance-free batteries (otherwise excessive gassing would occur at the negative electrode, due to antimony migration, and the internal pressure would rise to unacceptable levels).

For use in sealed maintenance-free lead-acid batteries, the requisite antimony-free grids may be made by casting or by rolling strips of lead-calcium type alloys. In one continuous casting process, the lead-calcium alloy is formed into a strip by partially immersing a cooled, rotating drum into the molten alloy and then continuously peeling off the chilled strip. The resulting strip has a finer grain structure on the side next to the rotating drum and a coarser structure on the last-to-cool surface.

To improve the castability and other properties of the lead-calcium alloys, ternary elements (such as tin or aluminum) may be added to the alloys. In any case, the structure and corrosion resistance of such alloys can be improved by enhancing the grain refinement.

Lead-calcium type alloy grids of the expanded metal type can also be produced from rolled strips. In this case, however, the metallurgical structure is the same on top and bottom surfaces of the grid, and may generally be finer than that of a continuously cast grid.

At least three problems are associated with antimony-free battery grids: intergranular corrosion and weakening of the positive grids (due to selective attack of the tin-rich grain boundaries); inadequate bonding of the active material to the grids; and premature loss of battery capacity during deep discharge/charge cycling. It is anticipated that these problems can be solved, at least in part, by the present invention.

Rare earth elements, such as mischmetal (ceriumlanthanum) and neodymium, are more corrosion resistant than tin. Thus, by adding rare earths to lead-calcium type battery grid alloys, the rate of intergranular corrosion could be reduced. By treating a mischmetal-containing grid according to the present invention, the mischmetal can be segregated in the grain boundaries and inhibit selective corrosion of the tin (or aluminum). Also, enhanced grain refinement would distribute the tin more extensively in thinner, more numerous, grain boundaries, thereby further increasing corrosion resistance.

SUMMARY OF THE INVENTION

The present invention includes the surface treatment of various compositions, and in particular leadcontaining compositions, with a laser so as to cause rapid melting and subsequent rapid cooling of the composition. This laser treatment creates a fine-grained microstructure free of cracks and having small uniformly dispersed regions of one element or compound (e.g. aluminum or antimony) within another (e.g. lead).

Surprisingly, it has been found that by controlling the intensity of the laser beam, the surface of a leadcontaining mixture can be rapidly melted and subsequently rapidly solidified without substantial fuming or oxidation of the lead or other metal(s).

Moreover, if such a mixture is allowed to cool using conventional casting techniques, the lead and aluminum will tend to separate and form large separate regions of elemental lead and aluminum, respectively. While known rapid solidification techniques can be employed so as to avoid the formation of such regions or islands, e.g., spraying fine droplets of the molten mixture into a liquid or gaseous cooling medium to yield a powder having a fine-grained microstructure, one will still be faced with the problem of vaporization and/or oxidation of the molten mixture at higher non-lead metal (e.g. aluminum) concentrations. Also, the resultant product, e.g., a powder, may require further and expensive fabrication and treatment before it is suitable for use as a battery grid.

By using the present invention, a lead-containing mixture can be surface treated with a laser beam so as to yield a product having a microstructure wherein the non-lead component (e.g. one or more of aluminum, antimony, calcium, tin, or rare earth) is uniformly dispersed in the lead as fine particles. The lead-containing mixture may be cast or may be comprised of various powders compacted, sintered or bound together (e.g. with an organic surfactant or binder) prior to laser treatment. Even at high aluminum concentrations, the lead-containing mixture may be laser melted without substantial vaporization or oxidation and without adversely affecting the resultant microstructure.

The present invention finds further and unique application in the surface treatment of expanded sheets. As noted above, efforts have been made to fabricate battery grids (such as lead-calcium-aluminum, lead-calcium-tin or lead-antimony) by expanded sheet techniques. By surface treating the expanded sheet with a laser beam, there is obtained a uniform, fine-grained battery grid having improved corrosion resistance and mechanical strength.

While not limited to battery grids, the rapid heating and cooling obtainable by laser treatment surprisingly yields a refined microstructure having unconventional, non-equilibrium phases particularly desirable in battery grids. This modification can provide dramatic improvements in corrosion resistance, electrical conductivity and mechanical strength. Also, by providing highly alloyed lead compositions without the emission of lead or other vapors, new much lighter battery components can be provided more economically without sacrificing (and indeed even enhancing) conductivity, corrosion resistance and strength.

DETAILED DESCRIPTION OF THE PREFERRED EMBODIMENTS

In order to obtain the desired final product of lead and other metal(s), one may start with an appropriate mixture in a variety of ways. For example, lead powder (e.g. <200 mesh) and aluminum powder (e.g. <325 mesh) may be mixed to obtain the desired volume fractions (e.g. 4% <Al<50%) and rolled and sintered into sheets.

Alternatively, separate sheets of lead and other metal(s) (e.g. a sheet of aluminum sandwiched between sheets of lead) may be used. To avoid possible segregation of aluminum at the edges of a sheet sandwich, a coaxial structure might be obtained whereby lead is extruded over a core of aluminum wire or the like. This coaxial structure could be laser treated directly or first rolled flat into sheets. Either way, there would be no exposed edges of aluminum.

The sheet or other structure may then be treated by passing a laser beam back and forth across the sheet surface much as an electron gun scans the surface of a cathode ray tube. The laser scanning may be continuous or pulsed. To prevent excessive agglomeration and segregation of aluminum or other metal in the lead battery grid, the laser power and traverse speed must be adjusted to provide fusion without excessive puddling. As the laser beam advances over the surface of the grid, the bulk of the strip will provide a heat sink that promotes nucleation sites behind the molten metal puddle. This will result in extremely rapid cooling and hence a fine dispersion of non-lead regions in the lead matrix.

For example, using a $CO_2$ laser with a maximum continuous power of 3.5 KW, and a maximum pulsed power of 25 KW, the surface may be continuously scanned at a power of 1-1.5 KW at a surface speed of from 1 to 10 (e.g. 3) m/sec. The distance from beam focus is about 12 mm and the beam diameter about 1.5 mm. The scanning speed and beam intensity may, of course, be adjusted for optimum results. Using a continuous laser beam, the desired degree of melting is typically obtained with an exposure time of any given portion of the surface from about 0.01 to about 0.0001 seconds. By minimizing the size of any given contiguous molten surface area (and thereby maximizing the cooling rate), the surrounding solid region will act as a large heat sink and cause very rapid quenching and solidification of the molten region as soon as the laser beam is turned off or moved from the region. It is this very rapid quenching which prevents the formation of large islands or regions of individual metals or compounds which would otherwise be formed under equilibrium conditions in a conventionally cast product. Hence, a refined grain structure with small, uniformly distributed such regions is thereby obtained.

In order to obtain the desired refined grain structure (e.g. wherein the non-lead components exist in regions of from about 0.003–30 microns in diameter, and preferably less than 1 micron or even 0.1 micron in maximum diameter) cooling rates greater than $10^{3°}$ K./sec are necessary. Indeed cooling rates greater than $10^{5°}$ K./sec and up to (and possibly exceeding) $10^{6°}$ K./sec are desirable. Such rapid cooling rates may be obtained by controlling the speed and intensity of the laser beam as well as the beam diameter For example, a small diameter beam passed rapidly over the material surface will result in the very rapid cooling and solidification of the portion melted by the laser. If a relatively large volume were melted, the surrounding solid material will not be able to absorb heat quickly enough to provide the desired cooling rate and hence will yield an undesireably coarse grain structure.

A refined grain structure contributes to enhanced corrosion resistance, conductivity and mechanical strength, all of which are important to the development of improved battery grids.

Also, as noted previously, lead-containing grids with refined grain structure and high concentrations of normally immiscible metals such as aluminum were normally obtainable only with considerable difficulty and expense, if indeed they were obtainable at all. By controlling the size of the molten regions and the time duration of the molten condition, and thereby causing rapid quenching, lead vaporization is minimized and a microstructure of small (e.g. less than 30, and preferably less than 0.1 microns), uniformly distributed aluminum islands are achieved.

Because the laser causes closely controllable and virtually instantaneous melting, even high aluminum content (>4%Al) lead mixtures may be melted without substantial vaporization or oxidation of lead or aluminum. Moreover, because only a small discrete portion of the material is subjected to melting at any given moment, very rapid cooling results since the isolated melted portion is surrounded by and effectively immersed in solid cool material.

The depth to which the material is to be melted by the laser will depend upon a number of factors, including the composition and structure of the material prior to treatment and the particular end use contemplated. In the field of battery grids, it is the surface which is exposed to the electrolyte and hence the surface which must have the desired corrosion resistance and electrical conductivity. Hence it may be sufficient to melt only the grid surface, e.g. to a depth of 1.5 mm. If only the surface layer is treated, the green strength of the structure must be adequate to support the weight of the entire battery grid. On the other hand, and particularly when treating relatively thin sheets or structures, it may he a simple matter to adjust the laser beam so as to melt substantially the entire grid volume without obtaining an undesirably low (and grain-coarsening) cooling rate. Also, it may be possible to treat both sides of the grid, (e.g. either with a single laser or with two lasers operating simultaneously), and if the total thickness of the final product is not substantially greater than double the depth of melting on one side, substantially all of the grid volume may be melted during treatment. The depth of the melting may also affect the overall strength of the grid.

By treating lead-aluminum compositions according to the present invention, a final product is obtainable having an aluminum concentration in excess of 4%—e.g. from about 4% to about 50% or even more by volume—and wherein the surface structure is fine-grained—e.g. the regions of aluminum concentration are uniformly dispersed and have a maximum diameter of less than about 30 microns, and preferably less than 0.1 microns. Non-lead regions less than 0.01 micron in diameter are obtainable.

The material to be treated may also be comprised of components other than lead and aluminum, and may be initially fabricated other than by compressing and/or sintering powder mixtures. For example, thin rolled sheets of lead and/or any number of other components (e.g. calcium, tin, antimony, or rare earths) may be treated. Lead need not even be a basic component, although many of the surprising benefits obtained according to the invention have particular application to and overcome problems previously encountered with lead-containing compositions.

The fine-grained microstructure and mechanical strength of lead-antimony grid alloys may be enhanced by laser treatment according to the invention. For example, a lead-antimony alloy (either cast or rolled and perforated) may be laser treated with surprisingly improved results.

With respect to the expanded sheet method, because of the diamond-shaped open mesh design of the expanded sheet, the laser beam may be repeatedly passed diagonally across the sheet, and after each pass be moved an incremental distance corresponding to the dimensions of the diamond-shaped openings. This can be accomplished automatically with known laser technology so as to yield a highly efficient process of grid manufacture.

After laser treatment, the expanded sheet battery grids should have a uniform smooth surface with enhanced grain refinement and greater mechanical strength All alloys will be polyphase, that is, the primary phase will be richer in lead than the secondary phases which form upon solidification and hence will have different electrical properties than the secondary phases. It is desirable that the secondary phases be dispersed as uniformly as possible and that substantially all such regions be less than 30 microns in diameter, and preferably less than 0.1 microns in diameter.

In addition to lead-aluminum and lead-antimony compositions, preferred embodiments of the present invention include laser treated compositions such as Pb-Ca-Sn, Pb-Ca-Al and Pb-rare earth.

Figure 3:
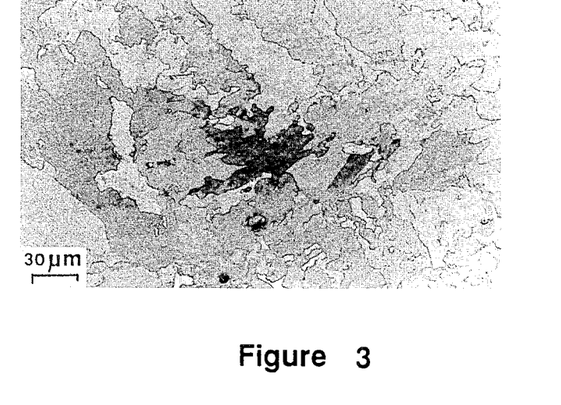
FIG. 3 is a photomicrograph of a Pb-Ca-Sn (0.096% Ca; 0.36% Sn; balance Pb) battery grid alloy prior to surface treatment according to the present invention.
Figure 4:
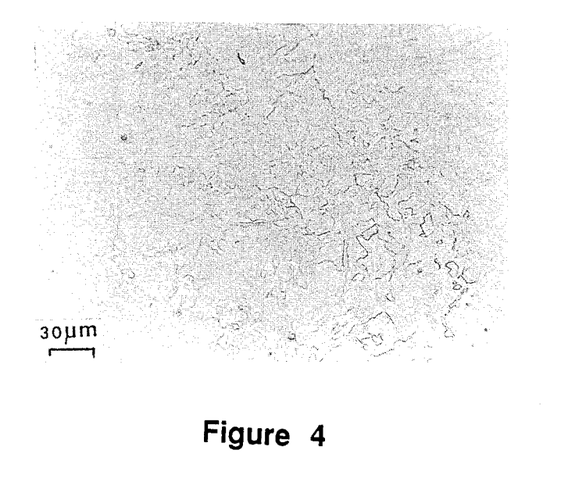
FIG. 4 is a photomicrograph of the alloy of FIG. 3 after surface laser treatment according to the invention.

In this regard, commercially available Pb-Ca-Sn battery grid material (Cominco DM cast 903 strip comprised of 0.096% Ca; 0.36% Sn; balance Pb) was surface treated according to the invention. Using the $CO_2$ laser described above, the grid material was surface treated with little or no discernible lead fuming. The resulting surface was shiny and sound, and the thickness was slightly reduced. FIG. 3 is a photomicrograph of the material before treatment, while FIG. 4 shows the grain refinement following treatment.

Figure 5:
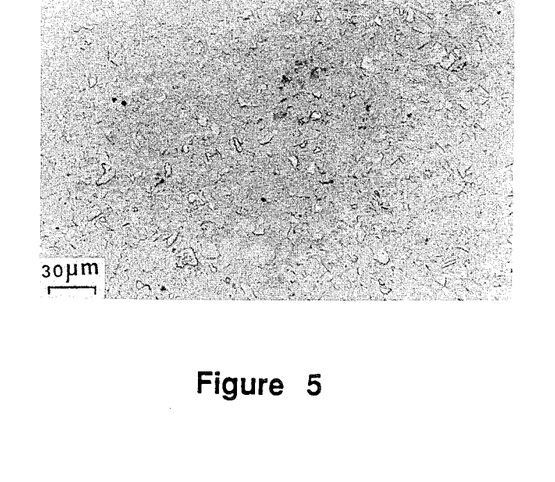
FIG. 5 is a photomicrograph of a rolled Pb-Ca-Sn (0.06% Ca; 0.8% Sn; balance Pb) battery grid alloy showing grain growth after multi-year storage.
Figure 6:
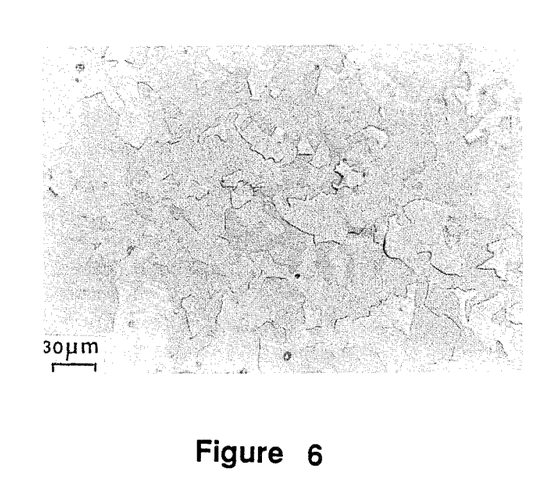
FIG. 6 is a photomicrograph of the alloy of FIG. 5 after surface laser treatment according to the invention.

Another conventional grid material (St. Joe wrought 608 strip comprised of 0.06% Ca; 0.8% Sn, balance Pb) was similarly treated. FIGS. 5 and 6 are photomicrographs showing the grain structure before and after treatment, respectively. In this regard, the relatively large grain structure shown in FIG. 5 may have occurred during prolonged storage (5-6 years) prior to treatment.

A further test sample of a lead-acid battery grid comprised of Pb, 0.12% Ca and 0.03 Al was laser treated. The resulting grid was ductile, shiny and sound.

Lead-based battery grids containing other or varying mixtures of added components may also be treated according to the invention. Lead-aluminum mixtures where the aluminum exceeds 50% by volume are contemplated. So too are lead-calcium-aluminum and lead-calcium-tin in varying concentrations, as well as lead-rare earth, lead-calcium-rare earth, and lead-tin-rare earth mixtures.

We claim:

1. A method of improving the surface characteristics of a lead-containing battery grid material, comprising directing a beam of laser light onto said surface so as to cause rapid melting of discrete regions of the surface exposed to said light, and thereafter ceasing to expose said region to said laser beam so as to cause rapid cooling and solidification of said region.

2. A method according to claim 1 including the step of causing the melted region to cool and solidify with sufficient speed as to yield a refined grain structure wherein non-lead regions are small and uniformly dispersed in the solidified grid material.

3. A method according to claim 2 including the step of causing the melted region to cool at a rate of at least $10^{5°}$ K./sec.

4. A method according to claim 3 wherein the non-lead regions are substantially no larger than about 3 microns in diameter.

5. A method according to claim 4 wherein the non-lead regions are substantially no larger than about 0.1 microns in diameter 6. A method according to claim 1 including the step of controlling the intensity of the laser beam and the time of exposure of said surface to said beam so as to cause said discrete regions to be melted without substantial vaporization of said lead.

7. A method according to claim 1 wherein the lead-containing grid material contains additionally aluminum.

8. A method according to claim 7 wherein the lead-containing grid material contains additionally aluminum from about 4% to about 50% aluminum by volume.

9. A method according to claim 8 including the step of controlling the intensity of the laser beam and the time of exposure of said surface to said beam so as to cause said discrete regions to be melted without substantial vaporization of said lead.

10. A method according to claim 3 including the step of controlling the intensity of the laser beam and the time of exposure of said surface to said beam so as to cause said discrete regions to be melted without substantial vaporization of said lead.

11. A method according to claim 10 wherein the lead-containing grid material contains additionally aluminum.

12. A method according to claim 11 wherein the lead-containing grid material contains additionally aluminum from about 4% to about 50% aluminum by volume.

13. A method according to claim 10 wherein the non-lead regions are substantially no larger than about 30 microns in diameter.

14. A method according to claim 13 wherein the non-lead regions are substantially no larger than about 0.1 microns in diameter.

15. A method according to claim 12 wherein the grid material, prior to treatment with the laser beam, is comprised of a mixture of lead powder and aluminum powder.

16. A method according to claim 15 wherein said mixture, prior to treatment with the laser beam, is pressed into sheet form.

17. A method according to claim 16 wherein said sheet is sintered prior to treatment with the laser beam.

18. A method according to claim 17 wherein the non-lead regions are substantially no larger than about 30 microns in diameter.

19. A method according to claim 3 including the steps of forming the grid material into sheet form, perforating said sheet with slits, stretching said perforated sheet in a direction transverse to said slits so as to create openings in said sheet, and thereafter treating the surface of the sheet with a laser beam.

20. A method according to claim 3 wherein the grid structure contains additionally antimony.

21. A method according to claim 20 including the steps of forming the grid material into sheet form, perforating said sheet with slits, stretching said perforated sheet in a direction transverse to said slits so as to create openings in said sheet, and thereafter treating the surface of the sheet with a laser beam.

22. A method according to claim 20 wherein the non-lead regions are substantially no larger than about 30 microns in diameter.

23. A method according to claim 21 wherein the non-lead regions are substantially no larger than about 30 microns in diameter.

24. A method according to claim 3 wherein the lead-containing battery grid additionally contains at least one of the group consisting of aluminum, antimony, calcium, tin and rare earth.

25. A method according to claim 24 wherein the lead-containing battery grid additionally contains calcium and aluminum.

26. A method according to claim 24 wherein the lead-containing battery grid additionally contains a rare earth.

27. A method according to claim 3 including the step of laying sheets containing lead and sheets containing at least one other metal atop one another, and thereafter treating said sheets with a laser so as to yield a fine grained structure wherein said at least one other metal is uniformly dispersed in the lead.

28. A method according to claim 3 including the step of co-extruding lead and at least one other metal thereby yielding an elongated structure of said at least one other metal surrounded by lead, and thereafter treating said structure with a laser so as to yield a fine grained structure wherein said at least one other metal is uniformly dispersed in the lead.

29. A method according to claim 28 wherein aluminum wire is co-extruded with and surrounded by lead.

30. A battery grid comprised of lead and at least one other metal, said grid having a surface that has been treated with a laser beam such that said at least one other metal is in the form of distinct regions uniformly distributed in the lead, said distinct regions being substantially no larger than 30 microns in diameter.

31. A battery grid according to claim 30 comprised of from about 4% to about 50% aluminum by volume, the balance substantially lead.

32. A battery grid according to claim 30 containing up to about 12% antimony, the balance substantially lead.

33. A lead-containing battery grid according to claim 30 additionally containing at least one of the group consisting of aluminum, antimony, calcium, tin and rare earth.

* * * * *

UNITED STATES PATENT AND TRADEMARK OFFICE
CERTIFICATE OF CORRECTION

PATENT NO. : 4,978,601

DATED : Dec. 18, 1990

INVENTOR(S) : Michael M. Kim and Dodd S. Carr

It is certified that error appears in the above-identified patent and that said Letters Patent is hereby corrected as shown below:

On the title page line 3, of ABSTRACT, "solidfication" should read --solidification--. Column 1, line 68, "leadaluminum" should read --lead-aluminum--. Column 2, line 26, "deepdischarge" should read --deep-discharge--. Column 3, line 47, "ceriumlan-" should read --cerium-lan- --; Column 3, lines 62-63, "leadcontaining" should read --lead-containing--. Column 4, lines 2-3, "leadcontaining" should read --lead-containing--. Column 8, lines 20-21, "3microns" should read --30 microns--.

Signed and Sealed this

Seventh Day of July, 1992

Attest:

DOUGLAS B. COMER

*Attesting Officer*    Acting Commissioner of Patents and Trademarks